(12) United States Patent
Hong

(10) Patent No.: US 12,150,079 B2
(45) Date of Patent: Nov. 19, 2024

(54) METHOD FOR INDICATING TIMING ADVANCE, AND COMMUNICATION DEVICE AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 459 days.

(21) Appl. No.: 17/626,779

(22) PCT Filed: Jul. 12, 2019

(86) PCT No.: PCT/CN2019/095885
§ 371 (c)(1),
(2) Date: Jan. 12, 2022

(87) PCT Pub. No.: WO2021/007731
PCT Pub. Date: Jan. 21, 2021

(65) Prior Publication Data
US 2022/0295432 A1    Sep. 15, 2022

(51) Int. Cl.
H04W 56/00 (2009.01)
H04W 8/20 (2009.01)
H04W 74/0833 (2024.01)
H04W 76/20 (2018.01)

(52) U.S. Cl.
CPC ........... *H04W 56/005* (2013.01); *H04W 8/20* (2013.01); *H04W 56/001* (2013.01); *H04W 74/0833* (2013.01); *H04W 76/20* (2018.02)

(58) Field of Classification Search
None
See application file for complete search history.

(56) References Cited

U.S. PATENT DOCUMENTS

| | | | |
|---|---|---|---|
| 8,908,672 B2 * | 12/2014 | Chin | H04W 56/00 370/350 |
| 9,151,844 B2 * | 10/2015 | Syrjärinne | G01S 19/05 |
| 9,648,525 B2 * | 5/2017 | Ponukumati | H04W 36/0061 |
| 9,854,601 B2 * | 12/2017 | Rajaee | H04L 1/1854 |
| 10,469,462 B2 * | 11/2019 | Kim | H04W 4/60 |
| 10,736,058 B2 * | 8/2020 | Xie | H04W 72/0446 |
| 2012/0020287 A1 * | 1/2012 | Chin | H04W 60/00 370/328 |

(Continued)

FOREIGN PATENT DOCUMENTS

| | | | | |
|---|---|---|---|---|
| CN | 102368878 A | 3/2012 | | |
| WO | WO-2014036517 A1 * | 3/2014 | | H04W 56/00 |

(Continued)

OTHER PUBLICATIONS

Chinese Patent Application No. 201980001367.6, Office Action dated Sep. 19, 2022, 5 pages.

(Continued)

*Primary Examiner* — Faiyazkhan Ghafoerkhan
(74) *Attorney, Agent, or Firm* — Cozen O'Connor

(57) ABSTRACT

A method for indicating a timing advance (TA) is provided. The method includes when a terminal includes at least two subscriber identification modules (SIMs), providing a TA of a first SIM of the at least two SIMS to at least one second SIM of the at least two SIMS for using.

18 Claims, 6 Drawing Sheets

(56) References Cited

U.S. PATENT DOCUMENTS

| | | | | |
|---|---|---|---|---|
| 2012/0040672 A1* | 2/2012 | Chin | ................. | H04W 56/0005 |
| | | | | 455/436 |
| 2012/0315896 A1* | 12/2012 | Syrjarinne | .............. | G01S 19/25 |
| | | | | 455/552.1 |
| 2014/0064117 A1* | 3/2014 | Chin | .................... | H04W 56/00 |
| | | | | 370/252 |
| 2015/0079985 A1* | 3/2015 | Vuchula | ................ | H04W 88/06 |
| | | | | 455/435.1 |
| 2016/0050590 A1* | 2/2016 | Ponukumati | .... | H04W 36/00835 |
| | | | | 455/437 |
| 2017/0164398 A1* | 6/2017 | Rajaee | ................. | H04W 88/06 |
| 2017/0317990 A1* | 11/2017 | Kim | ................... | H04W 12/065 |
| 2018/0035397 A1* | 2/2018 | Xie | ...................... | H04W 72/51 |
| 2019/0215792 A1* | 7/2019 | Ye | .......................... | H04L 45/20 |
| 2022/0295432 A1* | 9/2022 | Hong | ................ | H04W 74/0833 |

FOREIGN PATENT DOCUMENTS

| | | | |
|---|---|---|---|
| WO | WO 20140036517 A1 | 3/2014 | |
| WO | WO-2017128098 A1 * | 8/2017 | ........ H04W 56/0045 |

OTHER PUBLICATIONS

Chinese Patent Application No. 201980001367.6, English translation of Office Action dated Sep. 19, 2022, 10 pages.
PCT/CN2019/095885 English translation of International Search Report dated Apr. 3, 2020, 2 pages.
European Patent Application No. 19938039.5, Search and Opinion dated Mar. 1, 2023, 8 pages.

* cited by examiner

METHOD FOR INDICATING TIMING ADVANCE, AND COMMUNICATION DEVICE AND STORAGE MEDIUM

CROSS-REFERENCE TO RELATED APPLICATION

This application is a national phase of International Application No. PCT/CN2019/095885, filed on Jul. 12, 2019, the entire content of which is incorporated herein by reference.

TECHNICAL FIELD

The disclosure relates to the field of communication technologies, particularly wireless communication technologies, and more particularly, to a method for indicating a timing advance (TA), a communication device and a storage medium.

BACKGROUND

A timing advance (TA) is configured to compensate for a radio transmission delay caused by the distance between a terminal and a base station when the terminal performs an uplink transmission to the base station.

When the terminal is in an uplink out-of-synchronization state, if the base station has downlink data that need to be transmitted to the terminal, a random access process may be triggered. In the random access process, the base station first determines the TA by measuring a random access preamble transmitted by the terminal and the like signal; and transmits the TA to the terminal. The entire process of obtaining the TA may take up more network resources and consume the terminal power.

SUMMARY

According to a first aspect of embodiments of the disclosure, a method for indicating a TA is provided. The method includes the following.

When a terminal includes at least two subscriber identification modules (SIMs), providing a TA of a first SIM of the at least two SIMs to at least one second SIM of the at least two SIMs for using as a timing advance.

According to a second aspect of embodiments of the disclosure, a method for indicating a TA is provided. The method includes the following.

When a terminal includes at least two SIMS, issuing a TA of a first SIM of the at least two SIMS, in which the issued TA of the first SIM is configured for at least one second SIM of the at least two SIMS to use; or transmitting indication information to the terminal, in which the indication information is configured to indicate the terminal to provide the TA of the first SIM to the at least one second SIM for using as a timing advance.

According to a third aspect of embodiments of the disclosure, a communication device is provided. The communication device includes a processor, a transceiver, a memory and an executable program stored on the memory and capable of being executed by the processor, in which the processor is configured to execute the executable program to perform actions in the method for indicating the TA as described in the first aspect or the second aspect.

According to a fourth aspect of embodiments of the disclosure, a storage medium is provided. An executable program is stored on the storage medium, and when the executable program is executed by a processor, actions in the method for indicating the TA as described in the first aspect or the second aspect are performed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used herein in the description of the disclosure are only for the purpose of describing specific embodiments, but should not be construed to limit the disclosure. As used in the description of the disclosure and the appended claims, "a" and "the" in singular forms mean including plural forms, unless clearly indicated in the context otherwise. It should also be understood that, as used herein, the term "and/or"

represents and contains any one and all possible combinations of one or more associated listed items.

It should be understood that, although terms such as "first", "second" and "third" are used herein for describing various objects, these objects should not be limited by these terms. These terms are only used for distinguishing one object from another object. For example, a first object may also be called as a second object, and similarly, the second object may also be called as the first object, without departing from the scope of the disclosure. Depending on the context, the term "if" may be understood to mean "when" or "upon" or "in response to the determination of" or "according to the determination of" or "in response to the detection of", a precondition stated being true.

Figure 1:
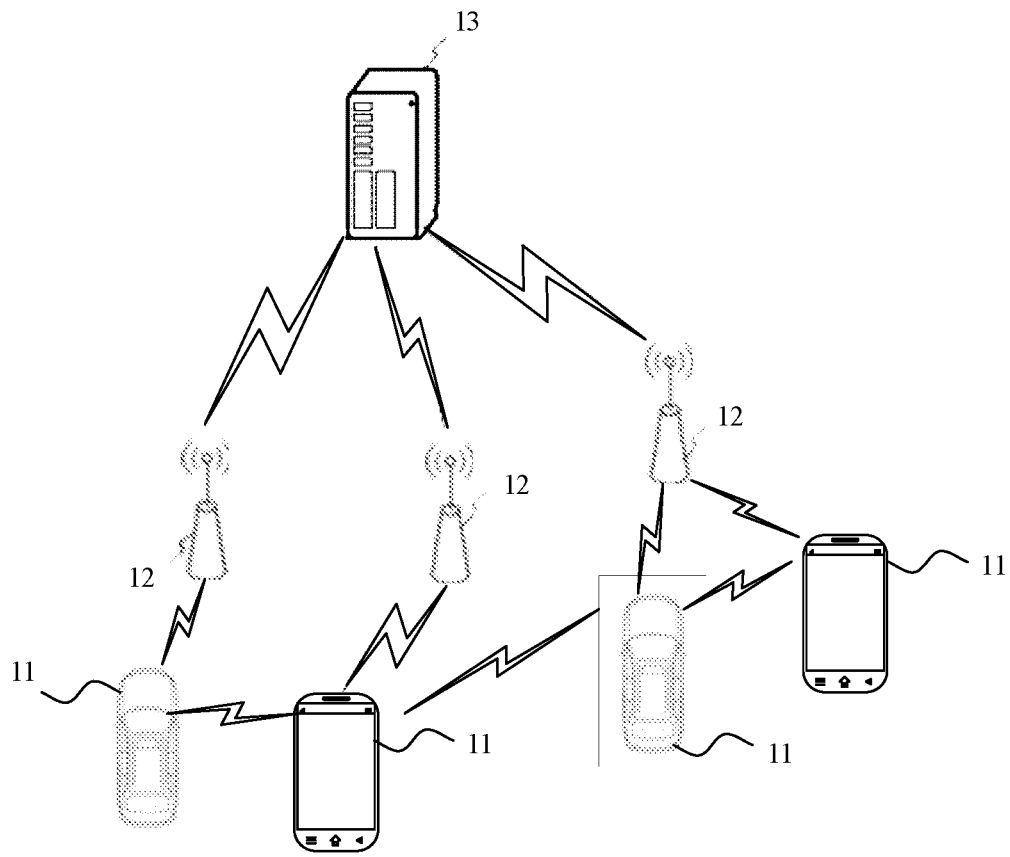
FIG. 1 is a schematic structural diagram illustrating a wireless communication system according to an embodiment.

Referring to FIG. 1, which illustrates a schematic structural diagram of a wireless communication system provided in embodiments of the disclosure. As illustrated in FIG. 1, the wireless communication system is a communication system based on cellular mobile communication technology. The wireless communication system includes several terminals 11 and several base stations 12.

The terminal 11 may be a device that provides voice and/or data connectivity to a user. The terminal 11 may communicate with one or more core networks via a radio access network (RAN). The terminal 11 may be an Internet of Things (IoT) terminal such as a sensor device, a mobile phone (or a cellular phone) and a computer with the IoT terminal such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment (UE). Alternatively, the terminal 11 may also be an unmanned aircraft. Alternatively, the terminal 11 may also be an in-vehicle device, for example, a trip computer having a wireless communication function or a wireless communication device connected to the trip computer. Alternatively, the terminal 11 may also be a roadside device, for example, a street lamp, a signal lamp or other roadside device having the wireless communication function.

The base station 12 may be a network side device in the wireless communication system. The wireless communication system may be the 4$^{th}$ generation mobile communication (4G) system, also known as the long term evolution (LTE) system. The wireless communication system may also be the 5$^{th}$ generation mobile communication (5G) system, also known as the new radio (NR) system or 5G NR system. Alternatively, the wireless communication system may also be a next-generation system of the 5G system. The access network in the 5G system may be called the new generation-radio access network (NG-RAN). The wireless communication system may also be the MTC system.

The base station 12 may be an evolved base station (eNB) adopted in the 4G system. Alternatively, the base station 12 may also be a base station (gNB) adopting a centralized and distributed architecture in the 5G system. When the base station 12 adopts the centralized distributed architecture, it usually includes a central unit (CU) and at least two distributed units (DUs). The CU is provided with a packet data convergence protocol (PDCP) layer, a radio link control (RLC) layer and a protocol stack having a media access control (MAC) layer. The DU is provided with a protocol stack having a physical (PHY) layer. The embodiment of the disclosure does not limit the specific implementation manner of the base station 12.

A wireless link may be established between the base station 12 and the terminal 11 through a wireless air interface. In different embodiments, the wireless air interface is a wireless air interface based on the 4G standard. Alternatively, the wireless air interface is a wireless air interface based on the 5G standard, for example, the wireless air interface is a NR. The wireless air interface may also be a wireless air interface based on a standard of next generation mobile communication network technology based on the 5G standard.

In some embodiments, an end to end (E2E) link may also be established between the terminals 11, for example, a vehicle to vehicle (V2V) communication, a vehicle to infrastructure (V2I) communication and a vehicle to pedestrian (V2P) communication in a vehicle to everything (V2X) communication.

In some embodiments, the above wireless communication system may also include a network management device 13.

The base stations 12 are coupled to the network management device 13 respectively. The network management device 13 may be a core network device in the wireless communication system. For example, the network management device 13 may be a mobility management entity (MME) of an evolved packet core (EPC). Alternatively, the network management device may also be other core network devices, such as a serving gateway (SGW), a public data network gateway (PGW), a policy and charging rules function (PCRF) unit or a home subscriber server (HSS). The implementation form of the network management device 13 is not limited in the embodiments of the disclosure.

The execution subjects involved in the embodiments of the disclosure include, but are not limited to: terminals and base stations that support multi-SIM.

The application scenario of the embodiments of the disclosure is that for a multi-SIM terminal, when one of SIMS of the multi-SIM terminal is in a radio resource control (RRC) connection state and is in an uplink out-of-synchronization state, if the base station has downlink data that need to be transmitted to the SIM, it needs to start a random access process for this SIM to determine a TA, and the random access process may occupy network resources and consume the terminal power.

Figure 2:
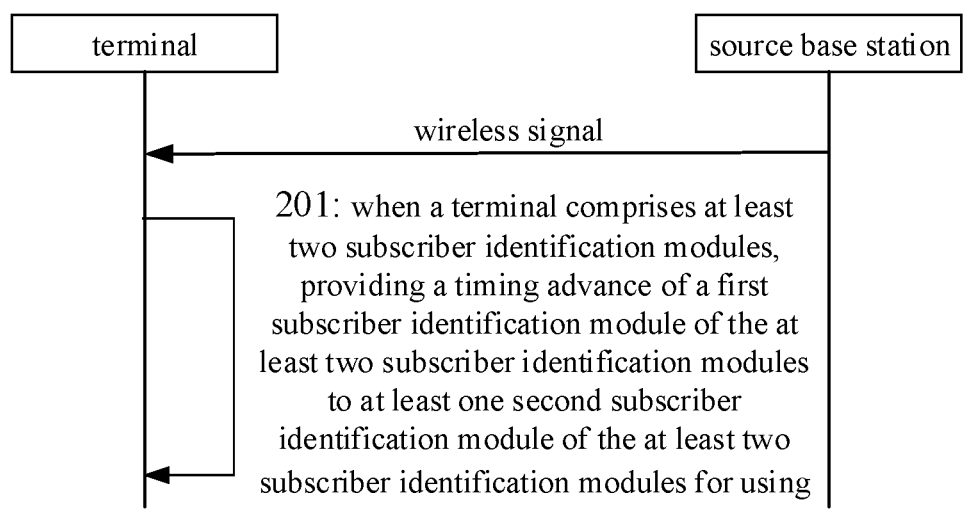
FIG. 2 is a flowchart of a method for indicating a TA according to an embodiment.

As illustrated in FIG. 2, a method for indicating a TA may be provided in embodiments. The method may be applied to a wireless communication device such as a terminal. The method includes the following.

In 201, when a terminal includes at least two SIMS, a timing advance of a first SIM of the at least two SIMS is provided to at least one second SIM of the SIMS for using as a timing advance.

The terminal herein may be a multi-SIM terminal. The behavior mode of the terminal may be a dual-SIM dual-standby single-pass, a dual-SIM dual-standby dual-pass or the like.

The SIM may be a SIM that exists in a form of a separate individual or an integrated SIM (e-SIM, embedded SIM) that exists inside the terminal in an integrated form.

The base station may determine that the first SIM and the second SIM belong to the same terminal through the information reported by the terminal; and the terminal may transmit the reported information directly to the base station or transmit the reported information to the core network and the core network transmit the reported information to the base station to which the terminal is connected.

The TA of the first SIM of the at least two SIMS is provided to the at least one second SIM of the at least two SIMS, which means that the TA of the first SIM is written into a register for storing the TA of the second SIM. In this way, when the second SIM transmits data to the base station, the TA of the first SIM is used as its own TA to compensate for the transmission delay caused by a distance between the terminal and the base station. The first SIM includes but is not limited to: a SIM in uplink synchronization.

The second SIM may obtain the TA without initiating the random access process, thereby reducing network resources and terminal power consumption due to initiating the random access process, and extending a standby duration of the terminal.

In an embodiment, before the providing the TA of the first SIM to the second SIM for using as a timing advance, the method further includes: receiving the TA of the first SIM from the base station.

The first SIM is a SIM in uplink synchronization, and the TA of the first SIM is stored in the base station and the terminal respectively.

The method of receiving the TA of the first SIM from the base station provided in embodiments may be applicable to the terminal not storing the TA of the first SIM, or the terminal storing the invalid TA of the first SIM.

The TA of the first SIM stored in the base station may be transmitted to the terminal through the base station.

In an embodiment, receiving the TA of the first SIM from the base station includes: receiving the TA of the first SIM from the base station through the second SIM.

The base station may directly transmit the TA of the first SIM stored in the base station to the second SIM, which is received by the terminal through the second SIM. For example, the TA of the first SIM is transmitted to the second SIM through an instruction such as a TA command media access control (MAC) control element (CE). The terminal may obtain the TA of the first SIM by parsing the instruction.

In an embodiment, receiving the TA of the first SIM from the base station includes: receiving the TA of the first SIM from the base station through the first SIM.

The base station may transmit the TA of the first SIM provided to the second SIM to the first SIM, and the terminal may receive the TA through the first SIM.

In an embodiment, providing the TA of the first SIM of the at least two SIMS to the at least one second SIM of the at least two SIMS for using, includes: forwarding the TA of the first SIM, received by the first SIM, to the second SIM for using as a timing advance.

After receiving the TA of the first SIM through the first SIM, the terminal may forward the received TA of the first SIM to the second SIM through the internal bus of the terminal and the like for using as a timing advance.

In an embodiment, the method further includes: receiving indication information from the base station. Providing the TA of the first SIM to the second SIM for using as a timing advance includes: providing the TA of the first SIM to the second SIM for using as a timing advance based on the received indication information.

The indication information may be negotiated in advance between the base station and the terminal. After receiving the indication information, the terminal may provide the TA of the first SIM stored in the terminal to the second SIM for using as a timing advance. The TA of the first SIM may be the TA stored in a register corresponding to the first SIM.

In an embodiment, the second SIM is a SIM in an RRC connection state and in an uplink out-of-synchronization state.

When the second SIM is in the RRC connection state and is in the uplink out-of-synchronization state, if the base station initiates data communication, the terminal first performs a random access to obtain the TA of the second SIM. Therefore, in this state, the random access process is not initiated, and the TA of the first SIM is provided to the second SIM for using as a timing advance, which may satisfy terminal communication requirements in time and reduce network resources and terminal power consumption due to initiating the random access process, and extend a standby duration of the terminal.

In an embodiment, networks to which the first SIM and the at least one second SIM are connected belong to a same operator.

If the networks connected to the first SIM and the second SIM belong to the same operator, the first SIM and the second SIM may be connected to the same base station with a higher probability. In this way, the distance between the first SIM to the base station is the same as the distance between the second SIM to the base station. That is, the same TA may be used. In this way, the second SIM uses the TA of the first SIM to more accurately compensate for the transmission delay.

At the same time, in practical applications, the SIMS of the same operator are more operable. The same base station may realize the communication connection with the first SIM and the second SIM.

Figure 3:
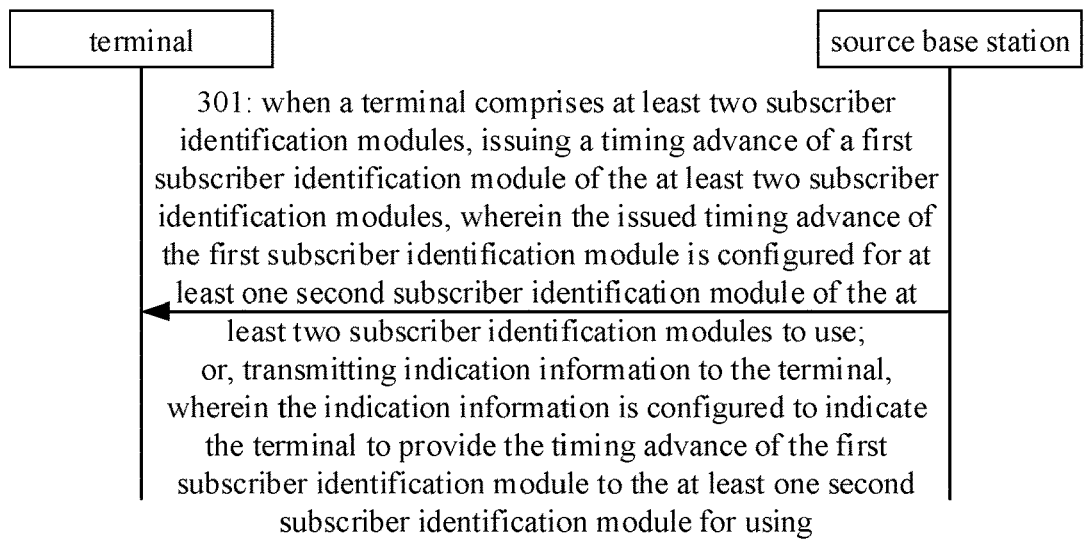
FIG. 3 is a flowchart of another method for indicating a TA according to an embodiment.

As illustrated in FIG. 3, a method for indicating a TA may be provided in embodiments. The method may be applied to a wireless communication device such as a base station. The method includes the following.

In 301, when a terminal includes at least two SIMS, a TA of a first SIM of the at least two SIMS is issued or indication information is transmitted to the terminal. The issued TA of the first SIM is configured for at least one second SIM of the at least two SIMS to use. The indication information is configured to indicate the terminal to provide the TA of the first SIM to the at least one second SIM for using.

The terminal herein may be a multi-SIM terminal. The behavior mode of the terminal may be a dual-SIM dual-standby single-pass, a dual-SIM dual-standby dual-pass or the like.

The SIM may be a SIM that exists in a form of a separate individual or an integrated SIM (e-SIM, embedded SIM) that exists inside the terminal in an integrated form.

The base station may determine that the first SIM and the second SIM belong to the same terminal through the information reported by the terminal; and the terminal may transmit the reported information directly to the base station or transmit the reported information to the core network and the core network transmit the reported information to the base station to which the terminal is connected.

The first SIM is a SIM in uplink synchronization, and the TA of the first SIM is stored in the base station and the terminal respectively.

The method of receiving the TA of the first SIM from the base station provided in embodiments may be applicable to the terminal not storing the TA of the first SIM, or the terminal storing the invalid TA of the first SIM.

The TA of the first SIM stored in the base station may be transmitted to the terminal through the base station, which is received by the terminal and provided to the second SIM for using as a timing advance. Or, the indication information is transmitted, and the terminal provides the TA of the first SIM stored in the terminal to the second SIM for using as a timing advance.

The indication information may be negotiated in advance between the base station and the terminal. After receiving the indication information, the terminal may provide the TA of the first SIM stored in the terminal to the second SIM for using as a timing advance. The TA of the first SIM may be the TA stored in a register corresponding to the first SIM.

The TA of the first SIM of the at least two SIMS is provided to the at least one second SIM of the at least two SIMS, which means that the TA of the first SIM is written into a register for storing the TA of the second SIM. In this way, when the second SIM transmits data to the base station, the TA of the first SIM is used as its own TA to compensate for the transmission delay caused by a distance between the terminal and the base station. The first SIM includes but is not limited to: a SIM in uplink synchronization.

The second SIM may obtain the TA without initiating the random access process, thereby reducing network resources and terminal power consumption due to initiating the random access process, and extending a standby duration of the terminal.

In an embodiment, issuing the TA of the first SIM, includes: transmitting the TA of the first SIM to the first SIM; or, transmitting the TA of the first SIM to the at least one second SIM.

The base station may directly transmit the TA of the first SIM stored in the base station to the second SIM, which is received by the terminal through the second SIM. For example, the TA of the first SIM is transmitted to the second SIM through an instruction such as a TA command MAC CE. The terminal may obtain the TA of the first SIM by parsing the instruction.

The base station may also transmit the TA of the first SIM provided to the second SIM to the first SIM, and the terminal may receive the TA through the first SIM.

After the terminal receives the TA of the first SIM through the first SIM, it may forward the received TA of the first SIM to the second SIM through the internal bus of the terminal and the like for using as a timing advance.

In an embodiment, before issuing the TA of the first SIM or transmitting the indication information, the method further includes: determining whether the TA of the first SIM is valid.

Issuing the TA of the first SIM includes: issuing the TA of the first SIM in response to that the TA of the first SIM is valid.

Transmitting the indication information to the terminal, includes: transmitting the indication information to the terminal in response to that the TA of the first SIM is valid.

It may be determined whether the TA of the first SIM is valid by determining whether there is the TA in a register corresponding to the TA of the first SIM, by an update frequency of the TA of the first SIM, by comparing the TA of the first SIM with a valid threshold range, or the like.

In this way, the validity of the TA may be improved, and the success rate of data transmission by the second SIM using the TA of the first SIM may be improved.

A specific example is provided below in conjunction with any of the foregoing embodiments.

This example is for a scenario where two SIMS of a dual-SIM user equipment (UE) belong to the same operator.

When the SIM #1 of the dual-SIM terminal is in the RRC connection state and is in the uplink out-of-synchronization state, if the base station has downlink data that need to be transmitted to the SIM #1 at this time, the base station may determine whether other SIMS rather than the SIM #1 in the terminal of the SIM #1 has a valid TA. If there is the valid TA, the TA is transmitted to the SIM #1.

The transmitting mode may be that the base station directly transmits to the SIM #1, for example, by TA command MAC CE.

The transmitting mode may also be that the base station transmits the valid TA to the SIM with the valid TA, and the SIM then forwards the received valid TA to the SIM #1.

The transmitting mode may also be that the base station directly indicates the SIM with the valid TA to directly inform the TA.

After receiving the valid TA, the terminal uses the TA to make the SIM #1 and the base station perform data transmission.

If none of the other SIMS of the multi-SIM terminal has the valid TA, the base station triggers the SIM to perform a random access to obtain the valid TA.

Figure 4:
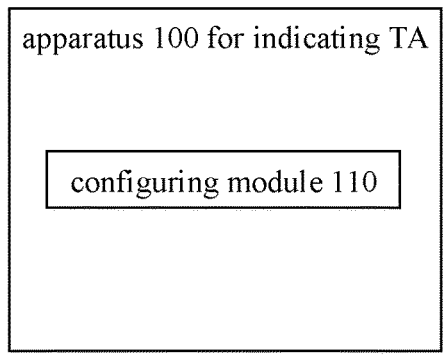
FIG. 4 is a block diagram of an apparatus for indicating a TA according to an embodiment.

The embodiments of the disclosure also provide an apparatus for indicating a TA, which is applied to a terminal. FIG. 4 is a block diagram of an apparatus 100 for indicating a TA according to an embodiment. As illustrated in FIG. 4, the apparatus 100 includes a configuring module 110.

The configuring module 110 is configured to, when a terminal includes at least two SIMS, provide a TA of a first SIM of the at least two SIMS to at least one second SIM of the at least two SIMS for using as a timing advance.

Figure 5:
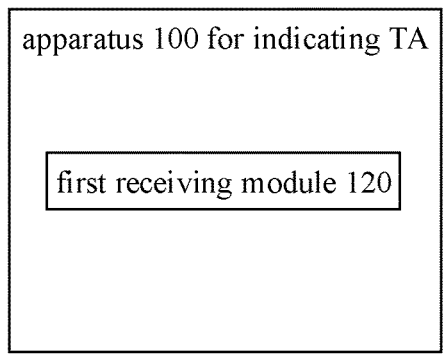
FIG. 5 is a block diagram of another apparatus for indicating a TA according to an embodiment.

In an embodiment, as illustrated in FIG. 5, the apparatus 100 further includes: a first receiving module 120, configured to, before providing the TA of the first SIM to the second SIM for using as a timing advance, receive the TA of the first SIM from a base station.

Figure 6:
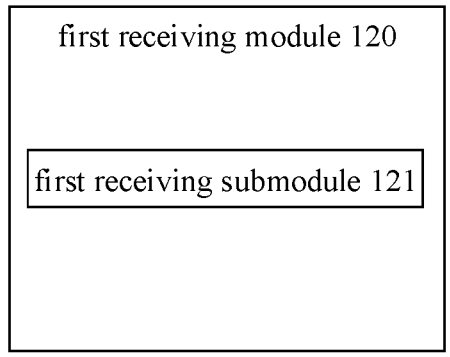
FIG. 6 is a block diagram of still another apparatus for indicating a TA according to an embodiment.

In an embodiment, as illustrated in FIG. 6, the first receiving module 120 includes: a first receiving submodule 121, configured to receive the TA of the first SIM from the base station through the second SIM.

Figure 7:
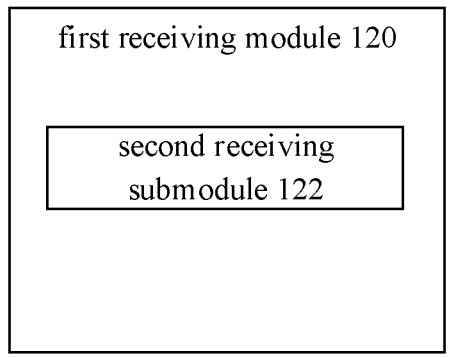
FIG. 7 is a block diagram of yet still another apparatus for indicating a TA according to an embodiment.

In an embodiment, as illustrated in FIG. 7, the first receiving module 120 includes: a second receiving submodule 122, configured to receive the TA of the first SIM from the base station through the first SIM.

Figure 8:
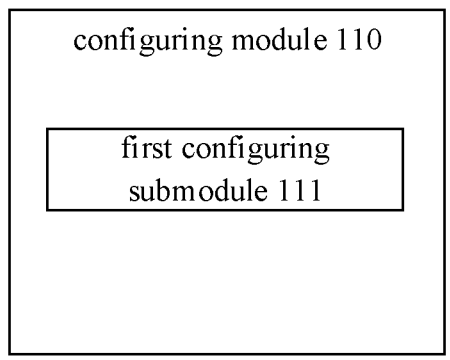
FIG. 8 is a block diagram of yet still another apparatus for indicating a TA according to an embodiment.

In an embodiment, as illustrated in FIG. 8, the configuring module 110 includes: a first configuring submodule 111, configured to forward the TA of the first SIM, received by the first SIM, to the second SIM for using as a timing advance.

Figure 9:
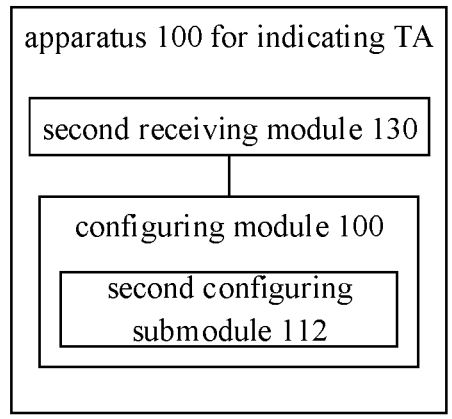
FIG. 9 is a block diagram of yet still another apparatus for indicating a TA according to an embodiment.

In an embodiment, as illustrated in FIG. 9, the apparatus 100 further includes: a second receiving module 130, configured to receive indication information from a base station.

The configuring module 100 includes: a second configuring submodule 112, configured to provide the TA of the first SIM to the second SIM for using as a timing advance based on the received indication information.

In an embodiment, the second SIM is a SIM in a radio resource control (RRC) connection state and in an uplink out-of-synchronization state.

In an embodiment, networks to which the first SIM and the at least one second SIM are connected belong to a same operator.

Figure 10:
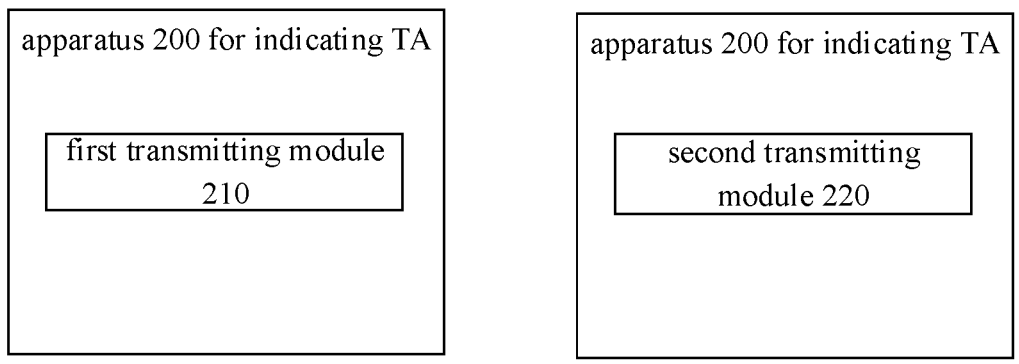
FIG. 10 is a block diagram of an apparatus for indicating a TA according to an embodiment.

The embodiments of the disclosure also provide an apparatus for indicating a TA, which is applied to a source base station. FIG. 10 is a block diagram of an apparatus 200 for indicating a TA according to an embodiment. As illustrated in FIG. 10a, the apparatus 200 includes a first transmitting module 210, configured to, when a terminal includes at least two SIMS, issue a TA of a first SIM of the at least two SIMS, in which the issued TA of the first SIM is configured for at least one second SIM of the at least two SIMS to use; or as illustrated in FIG. 10b, the apparatus 200 includes a second transmitting module 220, configured to, when the terminal includes the at least two SIMS, transmit indication information to the terminal, in which the indication information is configured to indicate the terminal to provide the TA of the first SIM to the at least one second SIM for using as a timing advance.

Figure 11:
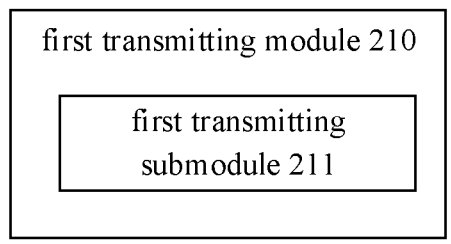
FIG. 11 is a block diagram of another apparatus for indicating a TA according to an embodiment.
Figure 12:
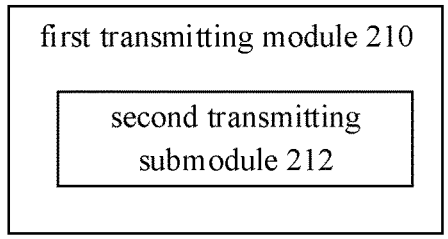
FIG. 12 is a block diagram of still another apparatus for indicating a TA according to an embodiment.

In an embodiment, as illustrated in FIG. 11, the first transmitting module 210 includes a first transmitting submodule 211, configured to transmit the TA of the first SIM to the first SIM; or, as illustrated in FIG. 12, the first transmitting module 210 includes the second transmitting submodule 212, configured to transmit the TA of the first SIM to the at least one second SIM.

Figure 13:
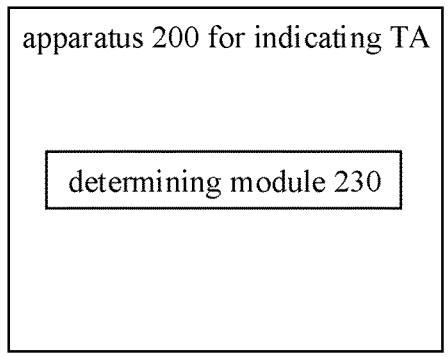
FIG. 13 is a block diagram of yet still another apparatus for indicating a TA according to an embodiment.

In an embodiment, as illustrated in FIG. 13, the apparatus further includes a determining module 230, configured to determine whether the TA of the first SIM is valid.

Figure 14:
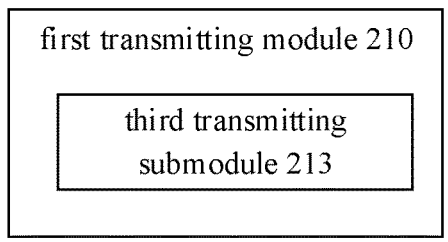
FIG. 14 is a block diagram of yet still another apparatus for indicating a TA according to an embodiment.

As illustrated in FIG. 14, the first transmitting module 210 includes a third transmitting submodule 213, configured to issue the TA of the first SIM in response to that the TA of the first SIM is valid.

Figure 15:
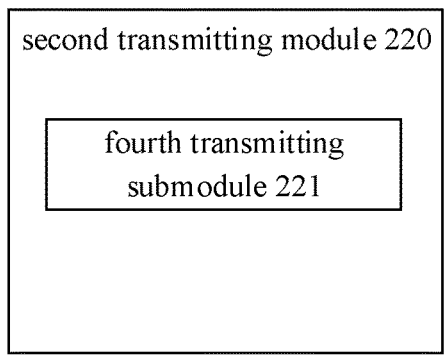
FIG. 15 is a block diagram of yet still another apparatus for indicating a TA according to an embodiment.

As illustrated in FIG. 15, the second transmitting module 220 includes a fourth transmitting submodule 221, configured to transmit the indication information to the terminal in response to that the TA of the first SIM is valid.

In an exemplary embodiment, the configuring module 110, the first receiving module 120, the second receiving module 130, the first transmitting module 210, the second transmitting module 220, the determining module 230 and the like may be implemented by one or more central processing units (CPUs), a graphics processing unit (GPU), a baseband processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor, or other electronic components, and may also be implemented in combination with one or more radio frequency (RF) antennas to perform the foregoing methods.

Figure 16:
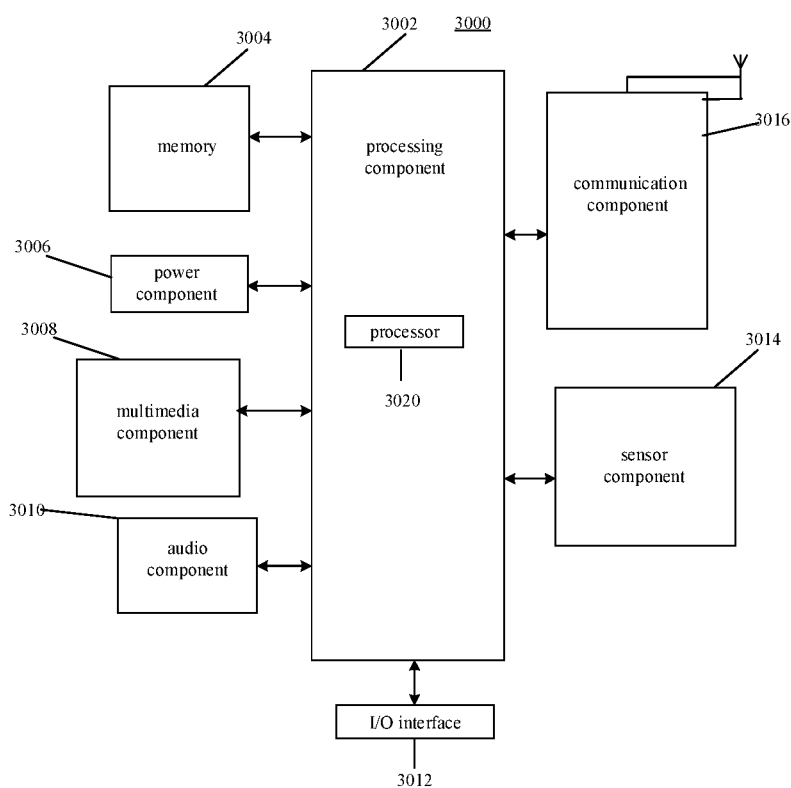
FIG. 16 is a block diagram of a device for indicating a TA according to an embodiment.

FIG. 16 is a block diagram of a device 300 for indicating a TA according to an embodiment. For example, the device 3000 may be a mobile phone, a computer, a digital broadcast terminal, a messaging device, a gaming console, a tablet, a medical device, exercise equipment, a personal digital assistant, and the like.

Referring to FIG. 16, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to execute instructions to perform all or part of the actions in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. The front camera and the rear camera may receive an external multimedia datum while the device 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone ("MIC") configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a CMOS or CCD image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 may access a wireless network based on a communication standard, such as WiFi, 2G, or 3G, or a combination thereof. In one exemplary embodiment, the communication component 3016 receives a broadcast signal or broadcast associated information from an external broadcast management system via a broadcast channel. In one exemplary embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 3004, executable by the processor 3020 in the device 3000, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the disclosure as come within known or customary practice in the art. It is intended that the specification and examples be considered as exemplary only, with a true scope and spirit of the invention being indicated by the following claims.

It will be appreciated that the disclosure is not limited to the exact construction that has been described above and illustrated in the accompanying drawings, and that various modifications and changes may be made without departing from the scope thereof. It is intended that the scope of the invention only be limited by the appended claims.

What is claimed is:

1. A method for indicating a timing advance, comprising:
   in response to a terminal comprising at least two subscriber identification modules, providing a timing advance of a first subscriber identification module of the at least two subscriber identification modules to at least one second subscriber identification module of the at least two subscriber identification modules for using,
   wherein, the second subscriber identification module is a subscriber identification module in a radio resource control (RRC) connection state and in an uplink out-of-synchronization state.

2. The method as claimed in claim 1, before providing the timing advance of the first subscriber identification module to the second subscriber identification module for using, further comprising:
   receiving the timing advance of the first subscriber identification module from a base station.

3. The method as claimed in claim 2, wherein receiving the timing advance of the first subscriber identification module from the base station, comprises:
   receiving the timing advance of the first subscriber identification module from the base station through the second subscriber identification module.

4. The method as claimed in claim 2, wherein receiving the timing advance of the first subscriber identification module from the base station, comprises:
   receiving the timing advance of the first subscriber identification module from the base station through the first subscriber identification module.

5. The method as claimed in claim 4, wherein providing the timing advance of the first subscriber identification module of the at least two subscriber identification modules to the at least one second subscriber identification module of the at least two subscriber identification modules for using, comprises:
   forwarding the timing advance of the first subscriber identification module, received by the first subscriber identification module, to the second subscriber identification module for using.

6. The method as claimed in claim 1, further comprising:
   receiving indication information from a base station;
   wherein providing the timing advance of the first subscriber identification module to the second subscriber identification module for using, comprises:
   providing the timing advance of the first subscriber identification module to the second subscriber identification module for using based on the received indication information.

7. The method as claimed in claim 1, wherein, networks to which the first subscriber identification module and the at least one second subscriber identification module are connected belong to a same operator.

8. A non-transitory computer-readable storage medium, wherein an executable program is stored on the storage medium, and when the executable program is executed by a processor, actions in the method for indicating the timing advance as claimed in claim 1 are performed.

9. A method for indicating a timing advance, comprising:
   in response to a terminal comprising at least two subscriber identification modules, issuing a timing advance of a first subscriber identification module of the at least two subscriber identification modules, wherein the issued timing advance of the first subscriber identification module is configured for at least one second subscriber identification module of the at least two subscriber identification modules to use;
   or,
   transmitting indication information to the terminal, wherein the indication information is configured to indicate the terminal to provide the timing advance of the first subscriber identification module to the at least one second subscriber identification module for using;
   wherein, the second subscriber identification module is a subscriber identification module in a radio resource control (RRC) connection state and in an uplink out-of-synchronization state.

10. The method as claimed in claim 9, wherein issuing the timing advance of the first subscriber identification module, comprises:
    transmitting the timing advance of the first subscriber identification module to the first subscriber identification module;
    or,
    transmitting the timing advance of the first subscriber identification module to the at least one second subscriber identification module.

11. The method as claimed in claim 9, before issuing the timing advance of the first subscriber identification module or transmitting the indication information, further comprising:
- determining whether the timing advance of the first subscriber identification module is valid;
- issuing the timing advance of the first subscriber identification module, comprises:
- issuing the timing advance of the first subscriber identification module in response to that the timing advance of the first subscriber identification module is valid;
- transmitting the indication information to the terminal, comprises:
- transmitting the indication information to the terminal in response to that the timing advance of the first subscriber identification module is valid.

12. A communication device, comprising a processor, a transceiver, a memory and an executable program stored on the memory and capable of being executed by the processor, wherein the processor is configured to execute the executable program to:
- in response to a terminal comprising at least two subscriber identification modules, provide a timing advance of a first subscriber identification module of the at least two subscriber identification modules to at least one second subscriber identification module of the at least two subscriber identification modules for using,
- wherein, the second subscriber identification module is a subscriber identification module in a radio resource control (RRC) connection state and in an uplink out-of-synchronization state.

13. The device as claimed in claim 12, wherein the processor is configured to execute the executable program to:
- before providing the timing advance of the first subscriber identification module to the second subscriber identification module for using, receive the timing advance of the first subscriber identification module from a base station.

14. The device as claimed in claim 13, wherein the processor is configured to execute the executable program to:
- receive the timing advance of the first subscriber identification module from the base station through the second subscriber identification module.

15. The device as claimed in claim 13, wherein the processor is configured to execute the executable program to:
- receive the timing advance of the first subscriber identification module from the base station through the first subscriber identification module.

16. The device as claimed in claim 15, wherein the processor is configured to execute the executable program to:
- forward the timing advance of the first subscriber identification module, received by the first subscriber identification module, to the second subscriber identification module for using.

17. The device as claimed in claim 12, wherein the processor is configured to execute the executable program to:
- receive indication information from a base station; and
- provide the timing advance of the first subscriber identification module to the second subscriber identification module for using based on the received indication information.

18. The device as claimed in claim 12, wherein, networks to which the first subscriber identification module and the at least one second subscriber identification module are connected belong to a same operator.

* * * * *